United States Patent [19]

MacAlpine

[11] 3,848,890

[45] Nov. 19, 1974

[54] COUPLING FOR CONNECTING TANDEM TRAILER TO BICYCLE

[76] Inventor: Alexander D. MacAlpine, 50 N. Main St., Natick, Mass. 01760

[22] Filed: Feb. 1, 1973

[21] Appl. No.: 328,523

[52] U.S. Cl. ................. 280/204, 280/457, 280/494
[51] Int. Cl. ............................................. B60d 1/12
[58] Field of Search ....... 280/204, 494, 457; 180/13

[56] References Cited
UNITED STATES PATENTS

| | | | |
|---|---|---|---|
| 624,678 | 5/1899 | Planes | 280/204 |
| 653,415 | 7/1900 | Ford | 280/204 |
| 2,343,019 | 2/1944 | Neal | 280/494 |
| 2,517,162 | 8/1950 | Arman | 280/204 X |

FOREIGN PATENTS OR APPLICATIONS

| | | | |
|---|---|---|---|
| 68,041 | 7/1944 | Norway | 280/204 |
| 879,400 | 11/1942 | France | 280/204 |

Primary Examiner—Leo Friaglia
Attorney, Agent, or Firm—Dike, Bronstein, Roberts, Cushman & Pfund

[57] ABSTRACT

A coupling for connecting the drawbar of a tandem trailer to the seat post of a bicycle frame comprising a clamp for clamping engagement with the seat post, a link rotatably connected to the clamp for rotation about a substantially horizontal axis perpendicular to the axis of the seat post, a post fixed to the other end of the link on which the loop at the end of the drawbar is adapted to be pivotally mounted, a jaw pivotally mounted on the link adjacent the post having a hook at its end for engagement with the inside of the loop and a hole for engagement with the post, and a latch plate mounted on the jaw for releasably holding the hook engaged with the inner side of the loop and the hole engaged on the post.

7 Claims, 3 Drawing Figures

PATENTED NOV 19 1974

3,848,890

3,848,890

COUPLING FOR CONNECTING TANDEM TRAILER TO BICYCLE

BACKGROUND OF THE INVENTION

Couplings for connecting trailers of the tandem-type to bicycles are shown in such U.S. Pats. as Nos. 2,343,019, 2,517,162 and 3,271,048. However, none of the aforesaid couplings provide for a freedom of movement to insure safety under all operating conditions. The coupling according to this invention is designed especially to allow the bicycle itself to fall over to one side or the other without upsetting the trailer; to allow for a very short radius of turn without binding; and to insure safety against separation of the trailer from the bicycle.

SUMMARY

The coupling according to this invention comprises a clamp adapted to be engaged with the seat post of the bicycle frame, a link pivotally connected at one end to the clamp, a post fixed to the other end of the link with which the loop is adapted to be pivotally engaged, a jaw pivotally mounted on the link adjacent the post, said jaw having a hook at its ends for engagement with the inner side of the loop and a hole for engagement with the post, and means mounted on the jaw for releasably holding the jaw with the hook engaged with the inner side of the loop and the hole engaged with the post. A swivel bar is pivotally mounted on the post and there are pairs of opposed spring clips mountd on the bar radially of the post for engagement with the loop. The clamp has at one end opposed arcuate portions for engagement with the seat post and there are bolts forwardly and rearwadly thereof for binding the clamp to the seat post. The other end of the clamp and one end of the link are pivotally connected for rotation about a substantially horizontal axis perpendicular to the seat post. The post is fixed to the other end of the link perpendicularly thereto and the swivel bar is mounted on the post for rotation in the horizontal plane about the vertical axis of the post. The means for holding the jaw engaged with the loop comprises a latch plate and spring means yieldingly holding the latch plate in its operative position.

The invention will now be described in greater detail with reference to the accompanying drawings wherein.

Figure 1:
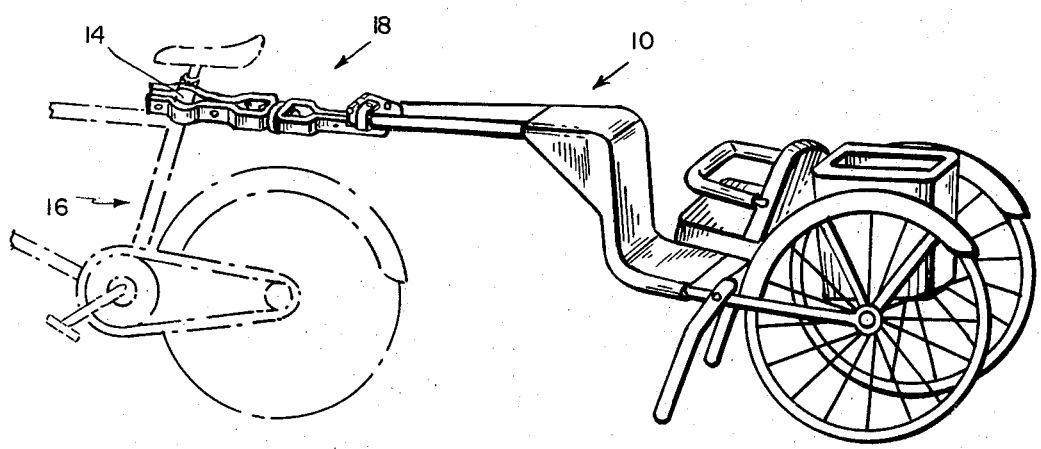
FIG. 1 is a perspective showing the coupling of this invention connecting the drawbar of a tandem-type trailer to the seat post of a bicycle frame, the latter being shown in dot and dash lines.
Figure 2:
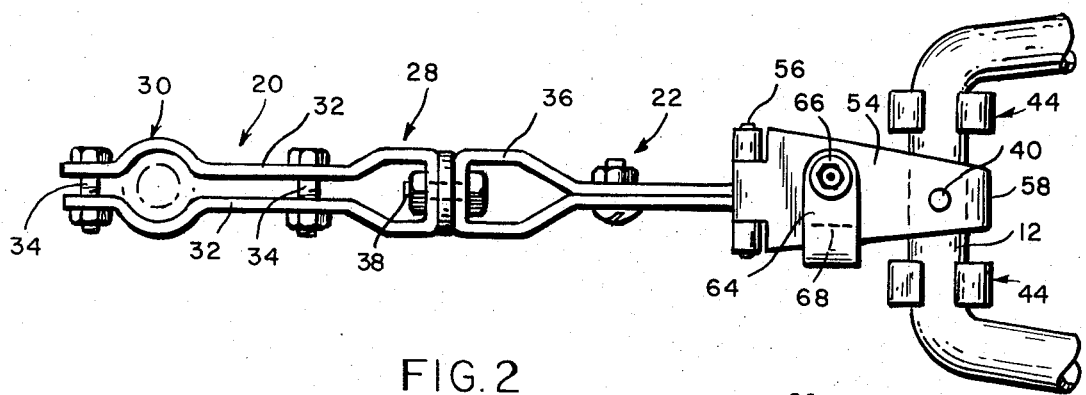
FIG. 2 is a plan view of the coupling to much larger scale.
Figure 3:
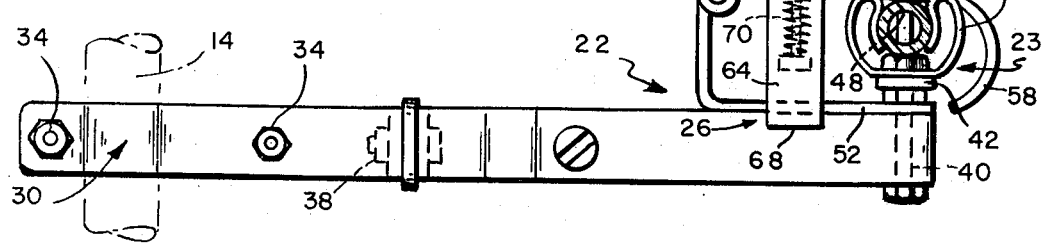
FIG. 3 is an elevation of the coupling shown in FIG. 2.

The tandem trailer shown in FIG. 1 of the drawings is like that which forms the subject matter of my U.S. Pat. No. 3,747,955 and as shown is provided with a drawbar 10 which at its forward end has a loop comprising a horizontal section 12 by means of which it is adapted to be connected to the seat post 14 of a bicycle frame indicated generally at 16. In the aforesaid pending application the loop at the forward end of the drawbar was placed over the seat about the seat post and this imposed certain limitations on the connection particularly in that it did not allow the freedom of movement of the bicycle relative to the tandem trailer that would insure under all conditions of use stability of the trailer. The coupling of this invention shown generally at 18 connecting the drawbar to the bicycle frame comprises a clamp 20, a link 22, a swivel bar 23, a jaw 24 and a latch plate 26.

The clamp 20 is comprised of a single length of metal straping bent on itself to provide at one end a stirrup 28 and at its other end arcuate portions 30—30. The arcuate portions 30—30 collectively define a clamp sleeve adapted to be placed about the seat post of a bicycle frame and bolts 34 mounted in suitable holes in the strap fore and aft of the arcuate portions 30—30 provide for binding the clamp to the frame.

The link 22 comprises a strap bent on itself to provide a stirrup 36 like the stirrup 28 and is pivotally connected to the stirrup 28 by a bolt 38, the axis of which is substantially horizontal and lies in the plane of the bicycle frame so that the clamp when fixed to the bicycle frame can rotate about a horizontal axis without applying a turning over moment to the trailer. The link 22 has at its opposite end a vertically mounted post 40 which projects from the upper side.

The swivel 23 is mounted on the post and comprises a horizontal, transversely extending bar 42 which is free to rotate about the vertical axis of the post 40. The bar 42 has mounted at its opposite ends spring clips 44—44, each comprising spaced opposed spring fingers 46—46 within which the loop at the forward end of the drawbar is adapted to be yieldably engaged. The drawbar, that is, the loop 12 which is engaged within the spring clips contains vertically disposed holes 48—48 for engagement with the post and is held on the post engaged with the spring fingers by the jaw 24 which comprises a fixed part 52 mounted on the link 22 and a pivoted part 54 pivotally connected at 56 to the fixed part. The pivoted part 54 of the jaw has at its distal end a hook 58 adapted to be moved downwardly over the inner side of the loop and contains a hole 60 for engagement with the post.

The latch plate 26 provides for holding the pivoted part of the jaw down on the post and comprises a C-shaped member having a limb 64 connected with the upper side of the pivoted part 54 and a limb 68 engaged with the underside of the fixed part 52. The limb 64 is releasably connected to the part 54 by a pin 66 extending vertically downwardly through the pivoted part 54 on which there is mounted a spring 70. The latch plate can be disengaged by rocking it laterally from the side of the link but as long as the limb 68 is maintained in engagement with the fixed part it will prevent upward movement of the movable part 54.

The coupling as thus constructed provides for maximum flexibility, safety and ease in attaching and detaching the trailer to the bicycle.

It should be understood that the present disclosure is for the purpose of illustration only and that this invention includes all modifications and equivalents falling within the scope of the appended claims.

I claim:

1. A coupling for connecting the loop at the end of the draw bar of a tandem trailer to the seat post of a bicycle frame comprising a clamp adapted to be clamped to the seat post, a link pivotally connected at one end to the clamp for rolling about a roll axis, a post fixed to the other end of the link on which the loop is adapted to be pivotally mounted for swivel movement, a jaw comprising a part pivotally mounted on the link adjacent to post, said jaw having a part at its end for engagement with the loop containing a hole for receiving said post and a fail safe hook disposed at the inner side of the loop and means mounted on the jaw for releasably holding said part in engagement to loop, with the hook disposed at the inner side of the loop and with the hole engaged with the post.

2. A coupling for connecting the loop at the end of a draw bar of a tandem trailer to the seat post of a bicycle frame comprising a clamp adapted to be clamped to the seat post, a link pivotally connected at one end to the clamp for rolling about a roll axis, a post fixed to the other end of the link on which the loop is adapted to be pivotally mounted for swivel movement, a jaw comprising a first part fixed to the link adjacent to post and a second part pivotally mounted thereon for pivotal movement to and from the first part, said second part embodying a hook adapted to be disposed at the inner side of the loop and containing a hole for receiving the post, and a latch mounted on the second part in engagement with the first part to hold the first part engaged with the pin and the hook disposed at the inner side of the loop.

3. A coupling according to claim 1, comprising a swivel bar pivotally mounted on the post and pairs of opposed spring fingers mounted on the bar radially of the post for engagement with the loop.

4. A coupling according to claim 1, wherein the clamp contains opposed arcuate portions for engagement with the seat post and bolts through it forwardly and rearwardly of the arcuate portions for binding the arcuate portions about the seat post.

5. A coupling according to claim 1, wherein the adjacent ends of the clamp and link are pivotally connected for rotation relative to each other about a substantially horizontal axis at right angles to the axis of the post.

6. A coupling according to claim 1, wherein the post is substantially perpendicular to the link.

7. Apparatus according to claim 2, wherein the means holding the second part closed is a latch plate and there is spring means yieldably holding the latch plate in latched position.

* * * * *